United States Patent
Haley et al.

(10) Patent No.: US 8,086,900 B2
(45) Date of Patent: Dec. 27, 2011

(54) SYSTEM, METHOD AND COMPUTER PROGRAM PRODUCT FOR TESTING A BOOT IMAGE

(75) Inventors: Stephen A. Haley, Round Rock, TX (US); Ricardo S. Puig, Round Rock, TX (US); Alvin J. Seippel, Austin, TX (US); Caryn N. Seippel, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 331 days.

(21) Appl. No.: 12/341,544

(22) Filed: Dec. 22, 2008

(65) Prior Publication Data

US 2010/0162047 A1 Jun. 24, 2010

(51) Int. Cl.
*G06F 11/00* (2006.01)
(52) U.S. Cl. .................................. 714/36; 713/1; 713/2
(58) Field of Classification Search ................. 713/1, 2; 714/36
See application file for complete search history.

(56) References Cited

U.S. PATENT DOCUMENTS

| | | | | |
|---|---|---|---|---|
| 5,764,593 A * | 6/1998 | Turpin et al. | | 713/2 |
| 5,974,567 A * | 10/1999 | Dickson et al. | | 714/27 |
| 6,247,126 B1 * | 6/2001 | Beelitz et al. | | 713/1 |
| 6,418,541 B1 * | 7/2002 | Jeon | | 714/36 |
| 6,807,643 B2 * | 10/2004 | Eckardt et al. | | 714/36 |
| 6,920,555 B1 * | 7/2005 | Peters et al. | | 713/100 |
| 6,931,522 B1 * | 8/2005 | Raghavan et al. | | 713/2 |
| 7,206,970 B1 * | 4/2007 | Lauterbach et al. | | 714/36 |
| 7,310,747 B2 * | 12/2007 | Lauterbach et al. | | 714/36 |
| 7,836,293 B1 * | 11/2010 | Wynia | | 713/2 |
| 7,865,711 B2 * | 1/2011 | Arafeh | | 713/2 |
| 2002/0083367 A1 * | 6/2002 | McBride et al. | | 714/15 |
| 2003/0014619 A1 * | 1/2003 | Cheston et al. | | 713/1 |
| 2005/0081118 A1 * | 4/2005 | Cheston et al. | | 714/47 |
| 2006/0095583 A1 * | 5/2006 | Owhadi et al. | | 709/238 |
| 2006/0143432 A1 * | 6/2006 | Rothman et al. | | 713/2 |
| 2006/0143433 A1 | 6/2006 | Stutton et al. | | |
| 2007/0011444 A1 | 1/2007 | Grobman et al. | | |
| 2007/0192466 A1 | 8/2007 | Nahum | | |
| 2007/0192654 A1 * | 8/2007 | Lauterbach et al. | | 714/36 |
| 2007/0234031 A1 * | 10/2007 | Garney | | 713/2 |
| 2008/0155331 A1 * | 6/2008 | Rothman et al. | | 714/36 |
| 2009/0138754 A1 * | 5/2009 | Edwards et al. | | 714/6 |
| 2009/0198988 A1 * | 8/2009 | Bai et al. | | 713/2 |
| 2009/0217025 A1 * | 8/2009 | Paul et al. | | 713/2 |
| 2009/0254641 A1 * | 10/2009 | Liu et al. | | 709/222 |
| 2009/0307477 A1 * | 12/2009 | Matthew et al. | | 713/2 |

* cited by examiner

*Primary Examiner* — Robert Beausoliel, Jr.
*Assistant Examiner* — Joshua P Lottich
(74) *Attorney, Agent, or Firm* — Matthew B. Talpis; James L. Baudino

(57) ABSTRACT

According to one embodiment of the present disclosure, a method for testing a boot image is disclosed. The method comprises creating a test boot image for a first logical partition, creating a second logical partition wherein the second logical partition is a duplicate of the first logical partition, initiating a boot sequence for the second logical partition using the test boot image, and returning a result of the boot sequence to a requestor.

22 Claims, 4 Drawing Sheets

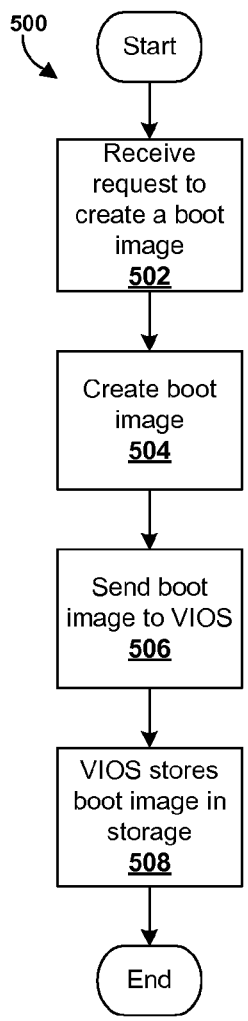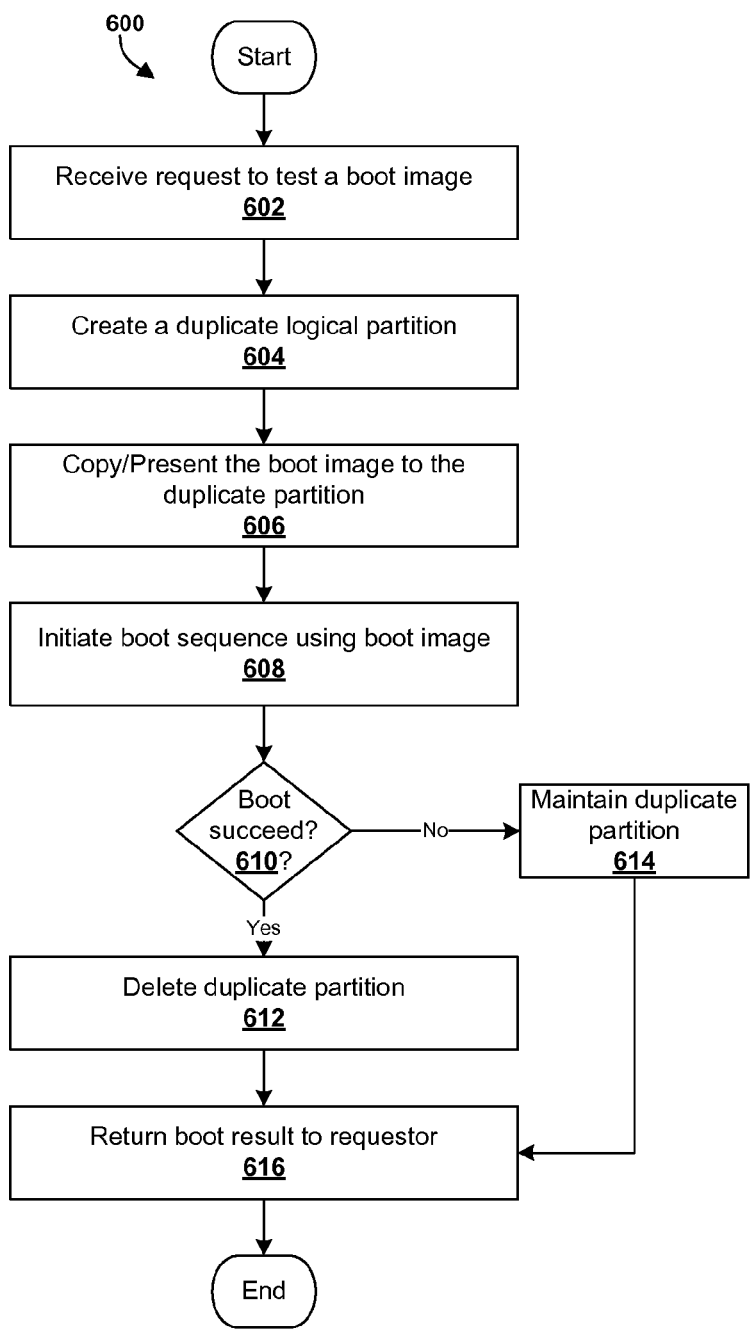

SYSTEM, METHOD AND COMPUTER PROGRAM PRODUCT FOR TESTING A BOOT IMAGE

BACKGROUND

A boot sequence is the initial set of operations that a computer performs when it is switched on. Part of the boot sequence includes finding a bootable device. Once a bootable device is found, operation is transferred to the boot sector of the bootable device. The boot sector comprises a boot image. The boot image is a data file that comprises boot instructions and configuration parameters for loading programs such as, but not limited to, the operating system.

BRIEF SUMMARY

According to one embodiment of the present disclosure, a method and technique for testing a boot image is disclosed. The method comprises testing a boot image intended for a first logical partition of a data processing system by creating a second logical partition on the data processing system, wherein the second logical partition is a duplicate of the first logical partition, initiating a boot sequence for the second logical partition using the boot image, and returning a result of the boot sequence to a requester.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which:

FIG. 5 is an embodiment of a process for creating a boot image; and

FIG. 6 is an embodiment of a process for testing a boot image.

DETAILED DESCRIPTION

Figure 1:
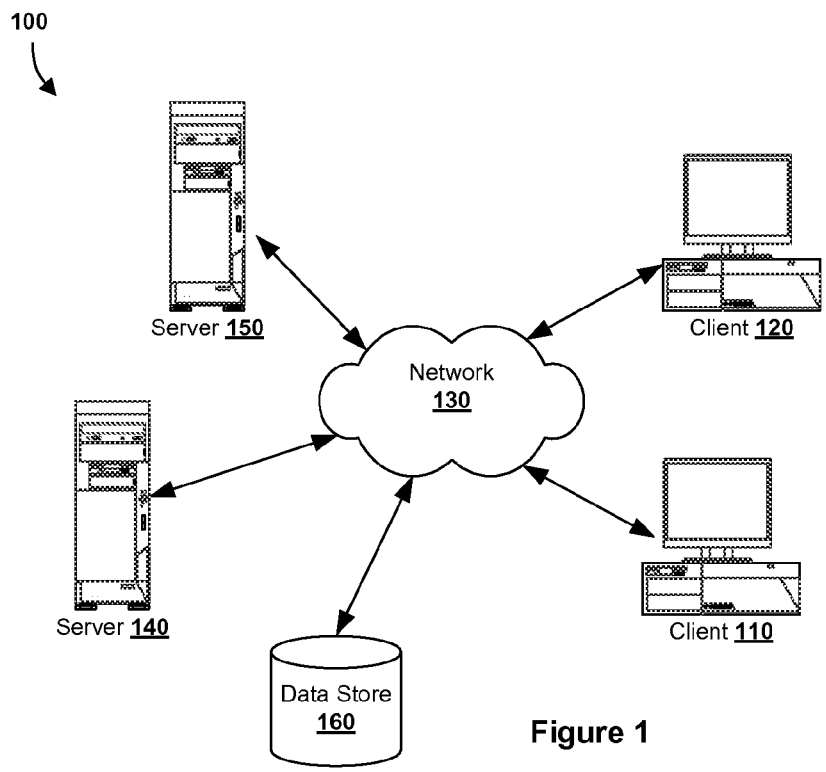
FIG. 1 is an embodiment of a network of data processing systems in which the illustrative embodiments of the present disclosure may be implemented.

Embodiments of the present disclosure provide a method, system and computer program product for testing a boot image for a data processing system. For example, in some embodiments, in a data processing system having a logical partition, a duplicate logical partition is created such that the duplicate logical partition is a duplicate of the logical partition for which the boot image is intended. The process initiates a boot sequence for the duplicate logical partition using the test boot image. If the boot sequence for the duplicate partition is successful, the duplicate partition may be deleted and the test boot image thereafter used for the intended logical partition. If the boot sequence for the duplicate logical partition is unsuccessful, the test boot image may be further evaluated and/or analyzed to identify the cause of the boot sequence error while the logical partition for which the test boot image is intended remains unaffected.

As will be appreciated by one skilled in the art, the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
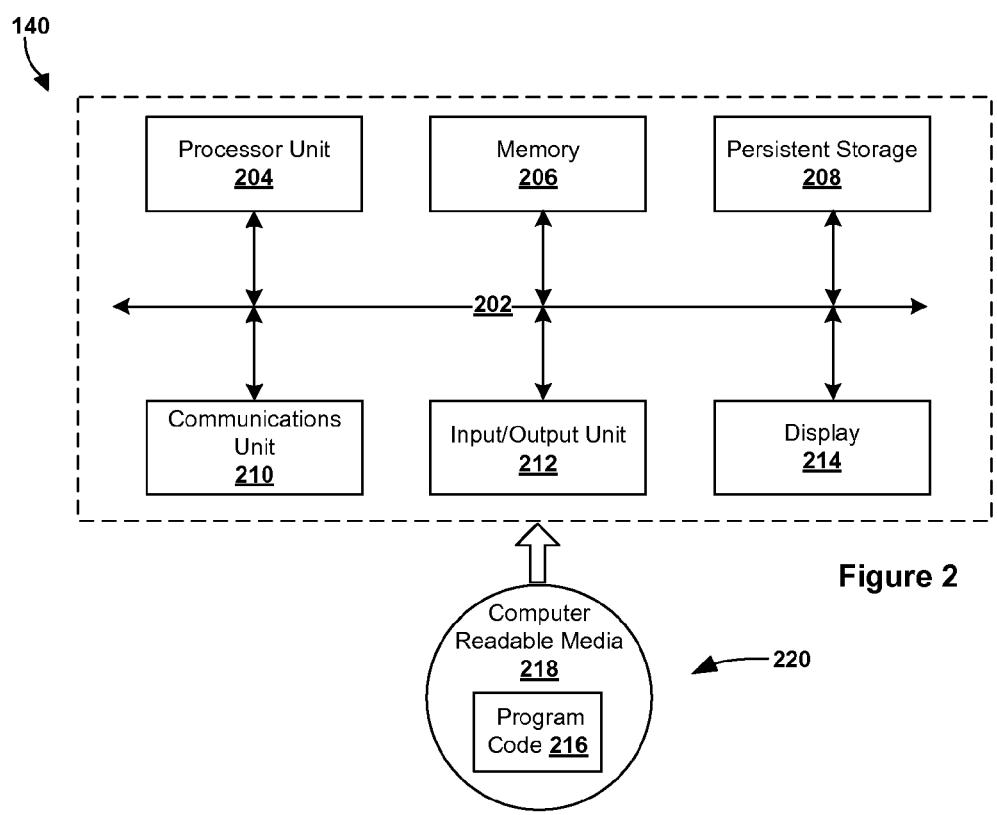
FIG. 2 is an embodiment of a data processing system in which the illustrative embodiments of the present disclosure may be implemented.

With reference now to the Figures and in particular with reference to FIGS. 1-2, exemplary diagrams of data processing environments are provided in which illustrative embodiments of the present disclosure may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing systems in which illustrative embodiments of the present disclosure may be implemented. Network data processing system 100 is a network of computers in which the illustrative embodiments of the present disclosure may be implemented. Network data processing system 100 contains network 130, which is the medium used to provide communications links between various devices and computers connected together within network data processing system 100. Network 130 may include connections, such as wire, wireless communication links, or fiber optic cables.

In some embodiments, server 140 and server 150 connect to network 130 along with data store 160. Server 140 and server 150 may be, for example, IBM System p® servers. In addition, clients 110 and 120 connect to network 130. Clients 110 and 120 may be, for example, personal computers or network computers. In the depicted example, server 140 provides data and/or services such as, but not limited to, data files, operating system images, and applications to clients 110 and 120. Network data processing system 100 may include additional servers, clients, and other devices.

In the depicted example, network data processing system 100 is the Internet with network 130 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

FIG. 2 is an embodiment of a data processing system such as, but not limited to, server 140 in which an embodiment of a boot image test application according to the present disclosure may be implemented. In this embodiment, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

In some embodiments, memory 206 may be a random access memory or any other suitable volatile or non-volatile storage device. Persistent storage 208 may take various forms depending on the particular implementation. For example, persistent storage 208 may contain one or more components or devices. Persistent storage 208 may be a hard drive, a flash memory, a rewritable optical disk, a rewritable magnetic tape, or some combination of the above. The media used by persistent storage 208 also may be removable such as, but not limited to, a removable hard drive.

Communications unit 210 provides for communications with other data processing systems or devices. In these examples, communications unit 210 is a network interface card. Modems, cable modem and Ethernet cards are just a few of the currently available types of network interface adapters. Communications unit 210 may provide communications through the use of either or both physical and wireless communications links.

Input/output unit 212 enables input and output of data with other devices that may be connected to data processing system 200. In some embodiments, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. For example, a storage device in data processing system 200 is any hardware apparatus that may store data. Memory 206, persistent storage 208, and computer readable media 218 are examples of storage devices in a tangible form.

Figure 3:
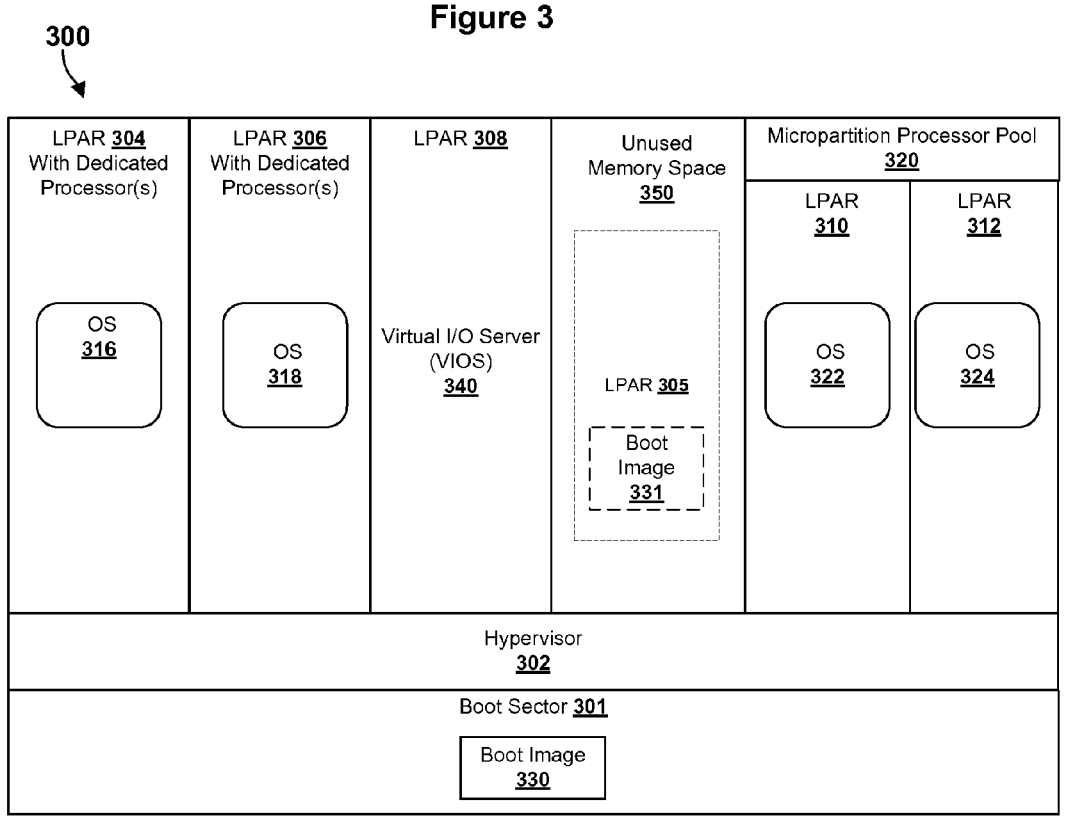
FIG. 3 is an embodiment of a boot image test platform.

FIG. 3 is an embodiment of a boot image test system 300. Boot image test system 300 may be implemented on a data processing system or platform such as, but not limited to, server 140 depicted in FIG. 1. In the depicted embodiment, boot image test system 300 comprises one or more logical partitions (LPARs) such as, but not limited to, LPAR 304, LPAR 306, LPAR 308, LPAR 310 and LPAR 312, a micropartition processor pool 320, a hypervisor 302, a virtual I/O server 340, and unused memory space 350.

A logical partition is a subset of computer's hardware resources, virtualized as a separate computer. A logical partition such as LPAR 304 and LPAR 306 may comprise one or more dedicated processors. In addition, logical partitions such as LPAR 310 and LPAR 312 may also share one or more processor(s) of a micropartition processor pool such as micropartition processor pool 320. Micropartition processor pool 320 improves system utilization and reduces hardware/software expenses by providing virtual processors.

In effect, a physical machine can be partitioned into multiple LPARs, each housing a separate operating system (OS). For example, LPAR 304, LPAR 306, LPAR 310, and LPAR 312 respectively comprise OS 316, OS 318, OS 322, and OS 324. In some embodiments, OS 316, OS 318, OS 322, and OS 324 may be different types of operating systems. Alternatively, in some embodiments, OS 316, OS 318, OS 322, and OS 324 may be the same type of operating system such as, but not limited to, IBM's Advanced Interactive eXecutive (AIX®) UNIX® operating system.

Hypervisor 302, also known as a virtual machine manager, is a program that enables multiple operating systems, such as, but not limited to, OS 316, OS 318, OS 322, and OS 324, to share a single hardware host. Each operating system appears to have the host's processor, memory, and other system resources all to itself. However, hypervisor 302 is actually controlling the host processor and the system resources, and allocates the necessary resources to each operating system.

In addition, virtual I/O server 340 located in LPAR 308 provides an operating environment for virtual I/O administration. Virtual I/O server 340 facilitates the sharing of physical I/O resources between the client logical partitions within the server, such as, but not limited to, LPAR 304, LPAR 306, LPAR 310, and LPAR 312, by creating virtual devices. For example, virtual I/O server 340 provides virtual small computer system interface (SCSI) target and shared ethernet adapter capability to client logical partitions within the data processing system, enabling the client logical partitions to share SCSI devices and ethernet adapters. In some embodiments, virtual I/O server 340 may be part of hypervisor 302.

Boot image 330 comprises boot instructions and configuration parameters for loading programs such as, but not limited to, operating system 316 on LPAR 304. For example, boot image 330 may comprise instructions for loading device drivers and other programs that are needed for the normal operation of OS 316. In some embodiments, boot image 330 is located in boot sector 301 of a storage device such as, but not limited to, persistent storage 208 as depicted in FIG. 2. Alternatively, in some embodiments, boot image 330 may be located elsewhere such as, but not limited to, a remote data storage location. In some embodiments, boot image 330 is accessible by virtual I/O server 340 and/or OS 316.

In some embodiments, after loading of OS 316, OS 316 may access boot image 330 via hypervisor 302 to modify boot image 330. For example, boot image 330 may be modified to update a device driver. Current methods for verifying that the modified and/or new boot image will work correctly are inefficient, time consuming, and expensive to maintain. For instance, current methods include trying to boot the actual system from the new/modified boot image. However, if the system fails to boot properly, the system may be down for an extended period of time while the system is debugged and/or while the system is restored from a backup. Another method is to maintain a separate duplicate physical system for testing purposes. However, this approach is also time consuming and expensive because every time a change is made to the primary system, the duplicate system must also be updated with the exact same change.

Accordingly, the disclosed embodiments present a system, method and computer program product for efficiently testing a boot image that overcomes the problems presented above. In some embodiments, the method comprises creating a logical partition that is a duplicate of a logical partition in which the boot image is intended, initiating a boot sequence for the duplicate logical partition using a test boot image, and returning a result of the boot sequence to a requester.

Figure 4:
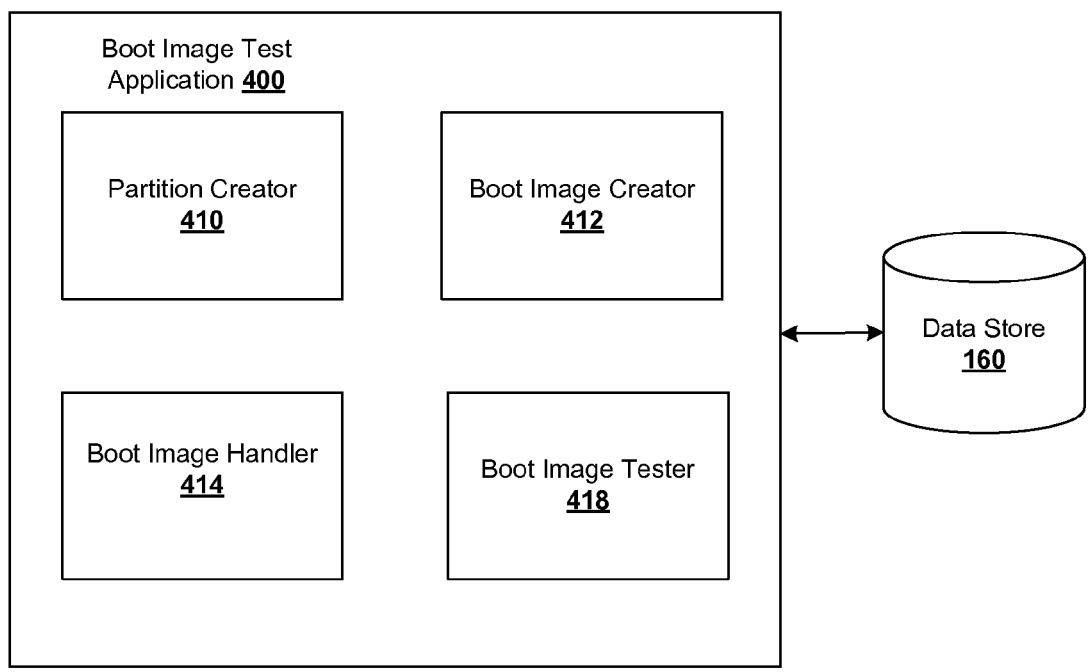
FIG. 4 is an embodiment of a boot image test application.

FIG. 4 is an embodiment of a boot image test application. In some embodiments, boot image test application 400 may be executed by OS 316, hypervisor 302, virtual I/O server 340, or by some other remote data processing system. Boot image test application 400 comprises instruction code for testing a boot image associated with an LPAR. In the depicted embodiment, boot image test application 400 comprises a partition creator 410, boot image creator 412, a boot image handler 414, and a boot image tester 418.

Partition creator 410 comprises instruction code for creating a duplicate logical partition of a logical partition in which the boot image is intended for use. For example, partition creator 410 may create a duplicate logical partition of LPAR 304 in unused memory space 350 for testing a boot image, illustrated as LPAR 305 in FIG. 3. LPAR 305 comprises identical virtual disks and resources as LPAR 304.

Boot image creator 412 comprises instruction code for copying an existing boot image and/or creating a new boot image. For example, if boot image 330 is corrupted, then a new boot image may be created. For instance, for the AIX® operating system, the "bosboot" command may be used to re-create the boot image. In the depicted embodiments, boot image 331 in FIG. 3 is a boot image to be tested and may be a newly created boot image to be associated with LPAR 304 or a modified copy of boot image 330. In some embodiments, boot image creator 412 may be a separate component from boot image test application 400.

Boot image handler 414 comprises instruction code for storing and accessing a boot image file. In addition, in some embodiments, boot image handler 414 may be used to modify a boot image such as, but not limited to, modifying boot image 330 to create boot image 331. For example, boot image 330 may be modified by adding, deleting, and/or modifying the boot configuration files and/or programs.

Boot image tester 418 comprises instruction code for testing a boot image such as, but not limited to, boot image 331. Boot image tester 418 initiates a boot sequence for a logical partition created for testing a boot image such as, but not limited to, LPAR 305 to test boot image 331. In some embodiments, LPAR 305 may comprise boot image 331. Alternatively, in some embodiments, boot image 331 may be located elsewhere such as, but not limited to, data store 160. In these embodiments, boot image tester 418 may access boot image 331 stored in data store 160 via Virtual I/O server 340 to initiate a boot sequence, without having to copy boot image 331 to LPAR 305. Boot image tester 418 monitors the boot sequence to determine if the boot sequence succeeds. Boot image tester 418 returns the result of the boot attempt to the requesting component. For example, in some embodiments, a request may be initiated by the operating system of the logical partition in which the boot image is intended for use. However, in some embodiments, the hypervisor and/or the virtual I/O server of the data processing system may initiate the request to test a boot image. In addition, in some embodiments, the requester may be a remote data processing system.

FIG. 5 is an embodiment of a process for creating and storing a boot image. Process 500 begins by receiving a request to create a test boot image for a logical partition at block 502. The process creates the boot image at block 504. In some embodiments, the test boot image is a copy of an existing boot image of a particular logical partition. The created copy of the boot image may then be modified. Alternatively, in some embodiments, the created test boot image may be a newly created boot image. At block 506, the process sends the created test boot image to the virtual I/O server via the hypervisor. The virtual I/O server stores the test boot image in a storage device such as, but not limited to, data store 160, at block 508, with process 500 terminating thereafter.

FIG. 6 is an embodiment of a process for testing a newly created and/or modified boot image. Process 600 begins by receiving a request to test the newly created and/or modified boot image at block 602. The process, at block 604, creates a duplicate logical partition of the logical partition in which the boot image is intended for use. In some embodiments, at block 606, the process copies the test boot image to the duplicate logical partition. Alternatively, at block 606, the process may present the test boot image to the duplicate logical partition without copying the test boot image to the duplicate logical partition. At block 608, the process initiates a boot sequence of the duplicate logical partition using the newly created and/or modified boot image. The process monitors the boot sequence to determine if the boot sequence succeeds at block 610. A boot sequence is successful if the operating system and other applicable programs, if any, load without encountering errors and/or within a specified period of time. In some embodiments, if the boot sequence succeeds, the process deletes the duplicate logical partition at block 612. Additionally, in some embodiments, if the boot sequence fails, the process may maintain the duplicate logical partition for further testing and/or debugging purposes at block 614. The process returns the result of the boot sequence to the requester at block 616, with process 600 terminating thereafter. In some embodiments, the process may return other type of information in place of or in addition to the result of the boot sequence. For example, the process may return information relating to the reason why a boot sequence failed.

Accordingly, the disclosed embodiments present a system and method for testing a boot image without having to maintain a separate testing data processing system. In addition, the disclosed embodiments enable the testing of a new or modified boot image without the risk that the system will down for an extended period of time.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

In addition, the flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method for testing a test boot image intended for a first logical partition of a data processing system, comprising:
   creating a second logical partition on the data processing system, wherein the second logical partition is a duplicate of the first logical partition, and wherein the first and second logical partitions represent separate virtual data processing systems;
   initiating a boot sequence for the second logical partition using the test boot image;
   returning a result of the boot sequence to a requestor; and
   maintaining the second logical partition in response to detecting an error in the boot sequence.

2. The method of claim 1, further comprising copying the test boot image to the second logical partition.

3. The method of claim 1, further comprising creating the test boot image by copying and modifying an existing boot image associated with the first logical partition.

4. The method of claim 1, further comprising newly creating the test boot image.

5. The method of claim 1, further comprising deleting the second logical partition after returning a successful result of the boot sequence.

6. The method of claim 1, further comprising, responsive to detecting an error in the boot sequence, returning information relating to a reason for the error.

7. The method of claim 1, further comprising receiving a request to test the test boot image from an operating system of the first logical partition.

8. The method of claim 1, further comprising receiving a request to test the test boot image from a hypervisor of the data processing system.

9. The method of claim 1, further comprising receiving a request to test the test boot image from a virtual I/O server.

10. The method of claim 1, further comprising receiving a request to test the test boot image from a remote data processing system.

11. The method of claim 1, further comprising storing the test boot image in an external storage device.

12. A system comprising:
    a data bus system;
    memory coupled to the data bus system, wherein the memory includes computer usable program code for testing a test boot image intended for a first logical partition of a data processing system; and
    a processing unit coupled to the data bus system, wherein the processing unit executes the computer usable program code to:
    create a second logical partition on the data processing system, wherein the second logical partition is a duplicate of the first logical partition, and wherein the first and second logical partitions represent separate virtual data processing systems;
    initiate a boot sequence for the second logical partition using the test boot image;
    return a result of the boot sequence to a requestor; and
    maintain the second logical partition in response to detecting an error in the boot sequence.

13. The system of claim 12, wherein the processing unit executes the computer usable program code to delete the second logical partition after returning a successful result of the boot sequence.

14. The system of claim 12, wherein the processing unit executes the computer usable program code to copy the test boot image to the second logical partition.

15. The system of claim 12, wherein the processing unit executes the computer usable program code to create the test boot image by copying and modifying an existing boot image associated with the first logical partition.

16. A computer program product comprising:
    a non-transitory computer usable storage medium including computer usable program code for testing a test boot image intended for a first logical partition of a data processing system, the computer program product comprising computer usable program code for:
    creating a second logical partition on the data processing system, wherein the second logical partition is a duplicate of the first logical partition, and wherein the first and second logical partitions represent separate virtual data processing systems;
    initiating a boot sequence for the second logical partition using the test boot image;
    returning a result of the boot sequence to a requestor; and
    maintaining the second logical partition in response to detecting an error in the boot sequence.

17. The computer program product of claim 16, further comprising program code for deleting the second logical partition after returning a successful result of the boot sequence.

18. The computer program product of claim 16, further comprising program code for copying the test boot image to the second logical partition.

19. A computer implemented method for testing a boot image intended for a first logical partition of a data processing system, comprising:
    creating a second logical partition on the data processing system, wherein the second logical partition is a duplicate of the first logical partition;
    initiating a boot sequence for the second logical partition using the boot image;
    returning a result of the boot sequence to a requestor; and
    maintaining the second logical partition in response to detecting an error in the boot sequence.

20. A computer implemented method for testing a boot image intended for a first logical partition of a data processing system, comprising:
    receiving a request to test the boot image from a virtual I/O server;
    creating a second logical partition on the data processing system, wherein the second logical partition is a duplicate of the first logical partition;
    initiating a boot sequence for the second logical partition using the boot image; and
    returning a result of the boot sequence to a requestor.

21. A system comprising:
    a data bus system;
    memory coupled to the data bus system, wherein the memory includes computer usable program code for testing a boot image intended for a first logical partition of a data processing system; and
    a processing unit coupled to the data bus system, wherein the processing unit executes the computer usable program code to:
    create a second logical partition on the data processing system, wherein the second logical partition is a duplicate of the first logical partition;
    initiate a boot sequence for the second logical partition using the boot image; and
    return a result of the boot sequence to a requestor; and
    maintain the second logical partition in response to detecting an error in the boot sequence.

22. A computer implemented method for testing a test boot image intended for a first logical partition of a data processing system, comprising:
    receiving a request to test the test boot image from a virtual I/O server;
    creating a second logical partition on the data processing system, wherein the second logical partition is a duplicate of the first logical partition, and wherein the first and second logical partitions represent separate virtual data processing systems;
    initiating a boot sequence for the second logical partition using the test boot image; and
    returning a result of the boot sequence to a requestor.

* * * * *